United States Patent
Inbar et al.

(10) Patent No.: US 12,411,622 B2
(45) Date of Patent: Sep. 9, 2025

(54) DYNAMIC ZONE GROUP CREATION AND RECALIBRATION BALANCING

(71) Applicant: Sandisk Technologies, Inc., Milpitas, CA (US)

(72) Inventors: Karin Inbar, Ramat Hasharon (IL); Liam Parker, Edinburgh (GB); Stephen Gold, Fort Collins, CO (US)

(73) Assignee: Sandisk Technologies, Inc., Milpitas, CA (US)

( * ) Notice: Subject to any disclaimer, the term of this patent is extended or adjusted under 35 U.S.C. 154(b) by 67 days.

(21) Appl. No.: 18/354,458

(22) Filed: Jul. 18, 2023

(65) Prior Publication Data

US 2024/0220138 A1 Jul. 4, 2024

Related U.S. Application Data

(60) Provisional application No. 63/478,283, filed on Jan. 3, 2023.

(51) Int. Cl.
*G06F 3/06* (2006.01)

(52) U.S. Cl.
CPC .......... *G06F 3/0631* (2013.01); *G06F 3/0616* (2013.01); *G06F 3/0644* (2013.01); *G06F 3/0673* (2013.01)

(58) Field of Classification Search
CPC .... G06F 3/0631; G06F 3/0616; G06F 3/0644; G06F 3/0673; G06F 3/061; G06F 3/064; G06F 3/0653; G06F 11/004; G06F 3/0679; G06F 12/0246
See application file for complete search history.

(56) References Cited

U.S. PATENT DOCUMENTS

| | | | |
|---|---|---|---|
| 2017/0124104 A1* | 5/2017 | Smith | G06F 16/148 |
| 2021/0026547 A1* | 1/2021 | Peh | G06F 3/0604 |
| 2021/0389911 A1* | 12/2021 | Reusswig | G06F 12/0891 |
| 2022/0382470 A1* | 12/2022 | Yang | G06F 3/0631 |
| 2022/0391115 A1* | 12/2022 | Muthiah | G06F 12/0607 |
| 2023/0028627 A1* | 1/2023 | Bhardwaj | G06F 3/064 |
| 2023/0289078 A1* | 9/2023 | Wells | G06F 3/0604 |
| 2024/0028219 A1* | 1/2024 | Bhan | G06F 12/0246 |
| 2024/0143183 A1* | 5/2024 | Hwang | G06F 3/0679 |
| 2024/0176527 A1* | 5/2024 | Peter | G06F 3/0647 |

* cited by examiner

*Primary Examiner* — Tasnima Matin
(74) *Attorney, Agent, or Firm* — PATTERSON + SHERIDAN, LLP (57) ABSTRACT

The present disclosure generally relates to creating and recalibrating zone groups. Rather than having a fixed zone group size, the zone group size can be dynamic where the data storage device provides a range of zone group sizes to a host device. Based upon block availability and host device commands, new zone groups may be formed of different sizes within the provided range. If there is an insufficient number of blocks available to create a zone group with a size within the provided range, the data storage device can recalibrate. The insufficient number of blocks may be due to bad blocks and/or fragmentation. To obtain more blocks, garbage collection can occur and/or the data storage device can request the host device to release some blocks. The dynamic zone group creation and recalibration ensures more efficient operation of the data storage device.

20 Claims, 9 Drawing Sheets

DYNAMIC ZONE GROUP CREATION AND RECALIBRATION BALANCING

CROSS-REFERENCE TO RELATED APPLICATIONS

This application claims benefit of U.S. Provisional Patent Application Ser. No. 63/478,283, filed Jan. 3, 2023, which is herein incorporated by reference.

BACKGROUND OF THE DISCLOSURE

Field of the Disclosure

Embodiments of the present disclosure generally relate to writing in a zone namespace (ZNS) environment.

Description of the Related Art

Zoned Namespace (ZNS) solid-state drive (SSD) architectures expect the host application(s) to always perform sequential writes, and deallocate data at the boundaries of the drive's block size, and thus removing the need of GC operations in drive and also removing the need of over-provisioning to support GC. This provides better utilization of drive's space and higher endurance.

ZNS zone groups combine multiple small zones that are allocated together that will be accessed together when writing or reading data into or from the zone group and the zones may be spread over multiple dies and planes. Zone groups are meant to be used for performance acceleration, by allowing the system to write to multiple plane-blocks in parallel, and even multiple dies.

However, the number of usable plane/die blocks is not always the same in all planes/dies due to uneven number of bad-blocks in each plane/die. Moreover, plane-blocks related to ZNS in the same zone-group may be released in different timings. As a result, when the drive is relatively full, there may be enough free blocks in order to create a zone-group, but the free blocks don't necessarily span different planes/dies. Therefore, the desired parallelism isn't achieved and the performance hit is significant. Even if only two blocks belong to the same plane-id, the throughput of the entire zone-group is cut by half, as the throughput is dictated by the slowest entity.

Therefore, there is a need in the art to provide a system solution that can optimize the performance of ZNS using the zone group capability in cases of fragmentation and/or defects.

SUMMARY OF THE DISCLOSURE

The present disclosure generally relates to creating and recalibrating zone groups. Rather than having a fixed zone group size, the zone group size can be dynamic where the data storage device provides a range of zone group sizes to a host device. Based upon block availability and host device commands, new zone groups may be formed of different sizes within the provided range. If there is an insufficient number of blocks available to create a zone group with a size within the provided range, the data storage device can recalibrate. The insufficient number of blocks may be due to bad blocks and/or fragmentation. To obtain more blocks, garbage collection can occur and/or the data storage device can request the host device to release some blocks. The dynamic zone group creation and recalibration ensures more efficient operation of the data storage device.

In one embodiment, a data storage device comprises: a memory device; and a controller coupled to the memory device, wherein the controller is configured to: detect lack of free blocks in specific dies/planes (could happen due to fragmentation of defects), such that full parallelism in a zone-group can't be achieved; and allocate a different number of zones within a new zone group compared to an already existing zone group.

In another embodiment, a data storage device comprises: a memory device; and a controller coupled to the memory device, wherein the controller is configured to: receive a zone lifetime hint from a host device; balance short lived and long lived zones across planes and dies of the memory device based upon the zone lifetime hint, wherein the balancing occurs in zone group creation and wherein a number of zones within a zone group is dynamic; and create a zone group based upon the balancing.

In another embodiment, a data storage device comprises: memory means; and a controller coupled to the memory means, wherein the controller is configured to: dynamically adjust zone group size; communicate a zone group size range to a host device; and balance short lived and long lived zones across planes and dies of the memory means based upon a zone lifetime hint received from the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to creating and recalibrating zone groups. Rather than having a fixed zone group size, the zone group size can be dynamic where the data storage device provides a range of zone group sizes to a host device. Based upon block availability and host device commands, new zone groups may be formed of different sizes within the provided range. If there is an insufficient number of blocks available to create a zone group with a size within the provided range, the data storage device can recalibrate. The insufficient number of blocks may be due to bad blocks and/or fragmentation. To obtain more blocks, garbage collection can occur and/or the data storage device can request the host device to release some blocks. The dynamic zone group creation and recalibration ensures more efficient operation of the data storage device.

Figure 1:
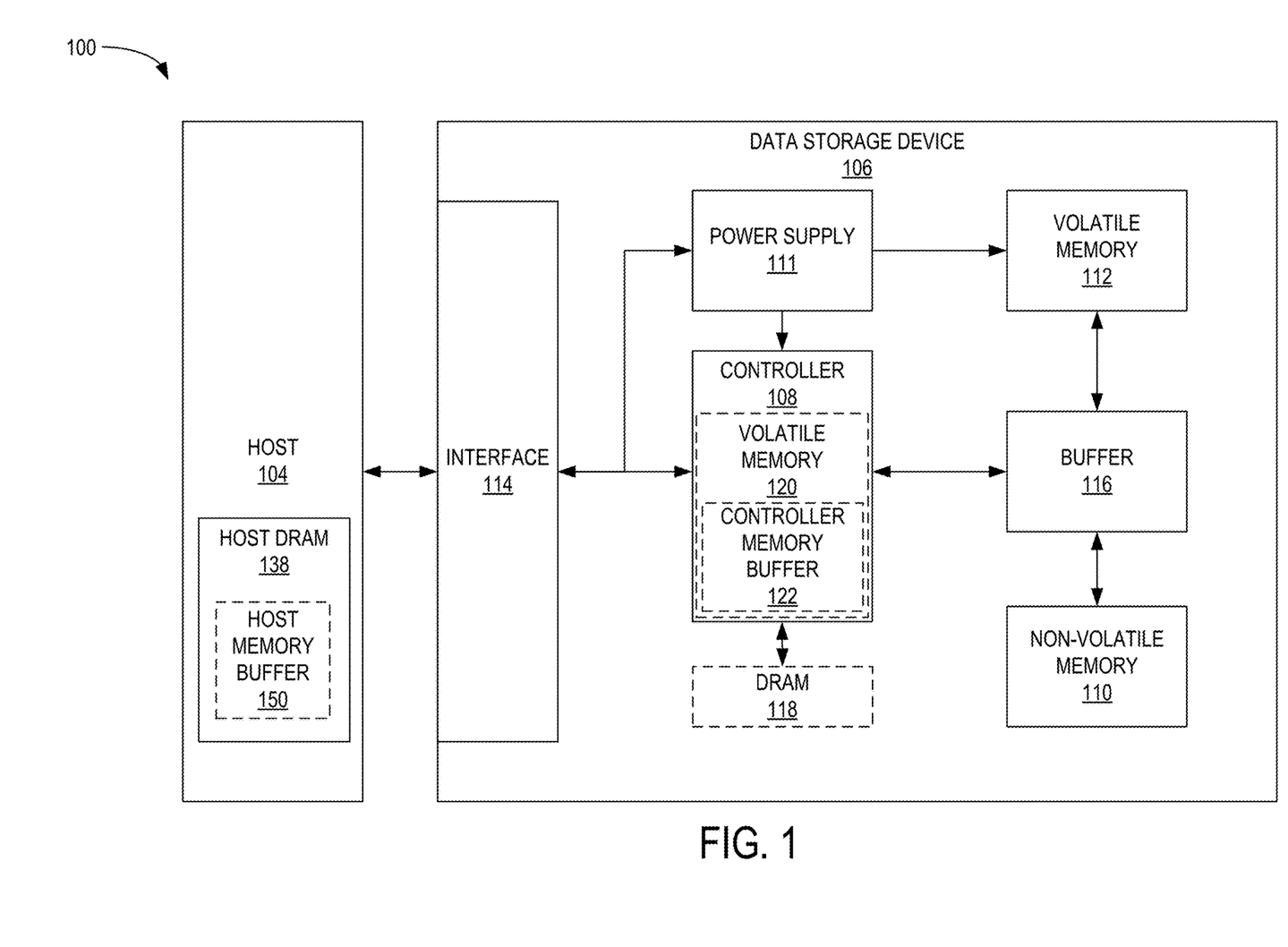
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

The data storage device detects bad blocks as device lifetime progresses. Bad blocks, or defects, can occur during production or develop over time. The controller tracks the location, both physical and logical, of the bad blocks. The controller also tracks the fragmentation of the memory device. Fragmentation occurs in good blocks that are invalidated at different times and numbers per planes and dies. Both fragmentation and defects can be solved by the embodiments discussed herein. As such, the data storage device, over time, develops a picture of the various planes and dies of the memory block that can and cannot be used for new writes and hence, new zone groups. For example, due to fragmentation or bad blocks, the controller, when forming a new zone group, may not be able to have the desired parallelism because there may not be sufficient available blocks across the dies within the plane to be able to form a zone group of the same size as all other previously formed zone groups. Hence, the controller has to either for a new zone group of different size or form a zone group that does not have good parallelism (i.e., zones are in different planes and possibly in the same die).

The data storage device should detect the situation and notify the host device to reclaim blocks from other zone-groups in attempt to release blocks of specific planes/dies (and potentially copy the data to other planes/dies with more available free blocks) or run internal GC to reclaim the blocks. However, GC or releasing blocks resolves only the cases of fragmentation as a result of zones being released in different timing, but wouldn't resolve issues due to having different number of defects across the planes. Moreover, the method has the penalty of GC operations within a ZNS drive.

As will be discussed herein, the host device is not aware of the current storage device block distribution per plane/die status. The host device knows how many free blocks the data storage device has in total, but the host device is not aware of the free blocks are distributed across the different planes/dies. Prior to the instant disclosure, the data storage device, when confronted with less planes/dies with available free blocks than desired to establish fixed size zone group with full parallelism, performs GC and released blocks.

Such a GC process is undesirable as being time consuming, burning program-erase cycles, and requiring extra over-provisioning to support GC, according to the GC rate in the drive. Rather than performing GC to enable achieving a fixed size zone group, a range of group sizes may be considered that will enable the data storage device to write to a zone group. Take for example a zone group with a fixed size of 16 blocks. To obtain maximum performance, 16 blocks need to be available from different planes. If there are insufficient blocks available in different planes, such as for example 15 in different planes and 1 in the same plane as one of the 15, then performance is reduced by 50% because 2 blocks would be written in series rather than in parallel. Hence, GC may be performed to achieve the desired parallel writing.

Alternatively, if the zone group size is not a fixed number, but rather, a range (e.g., 14-18 blocks), then when there are only 14 or 15 blocks available, the zone can be created and written in parallel without a need for GC or longer writing time. In this example, if 15 blocks can be allocated rather than 16, all from different planes, the performance impact is 6% rather than 50%. If the number of available blocks is outside of the zone range, then GC can be performed, but GC is not ideal from a system performance point of view. As one can see, GC can still take place, but as a secondary option when the fragmentation or defect problem is sufficiently severe to render the number of available blocks outside of the range, e.g., if current free blocks allows only a parallelism of 4 planes/dies rather than 16.

Figure 2:
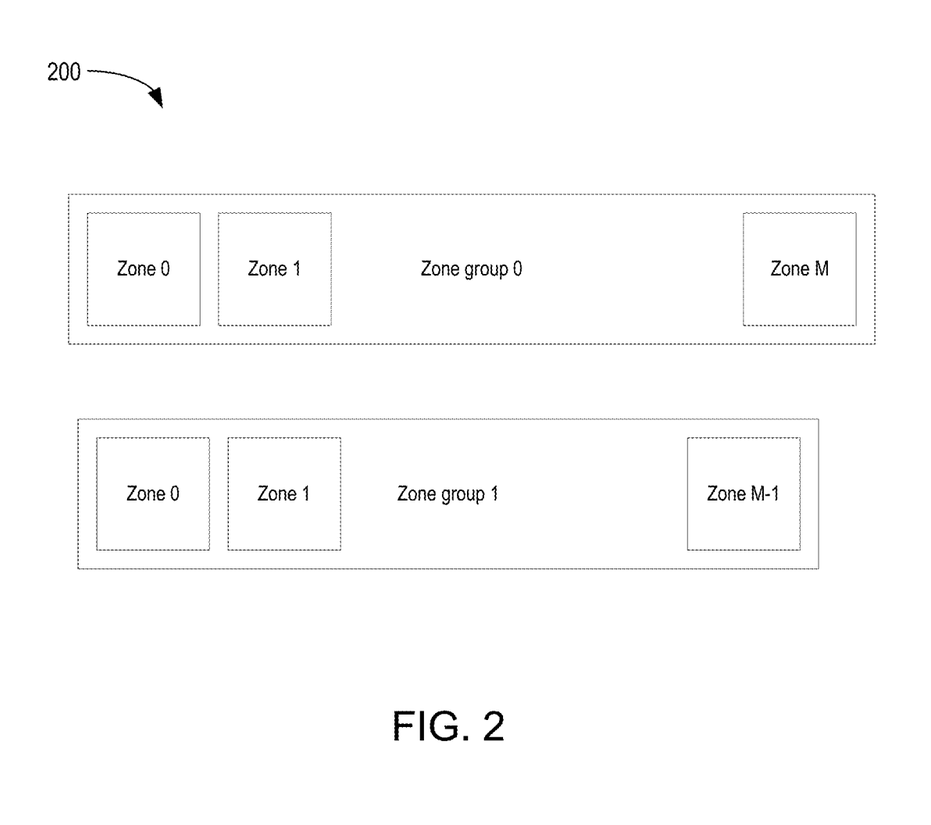
FIG. 2 is schematic illustration of different sized zone groups.

To resolve fragmentation and/defects, the data storage device controller is configured to calculate the desired range size for the zone-group width, in a way that maximizes performance, maximizes the usage of available good blocks, and aims to keep performance consistency across different zone-groups. FIG. 2 is schematic illustration 200 of different sized zone groups. Zone group 0 has M zones within the zone group. Zone group 1 has M–1 zones (i.e., one less zone than Zone group 0). As zones of the same zone group are released in different timing, the zone-group needs to be created every time the host allocates new zones, and the drive should decide on zone-group width on every zone-group creation. Therefore, zone groups are not constant over the drive life time. Nevertheless, during initialization, the algorithm will determine the initial settings for zone group size and the way to construct the zones, which will address any fragmentation as a result of different number of defects across the planes.

Figure 3:
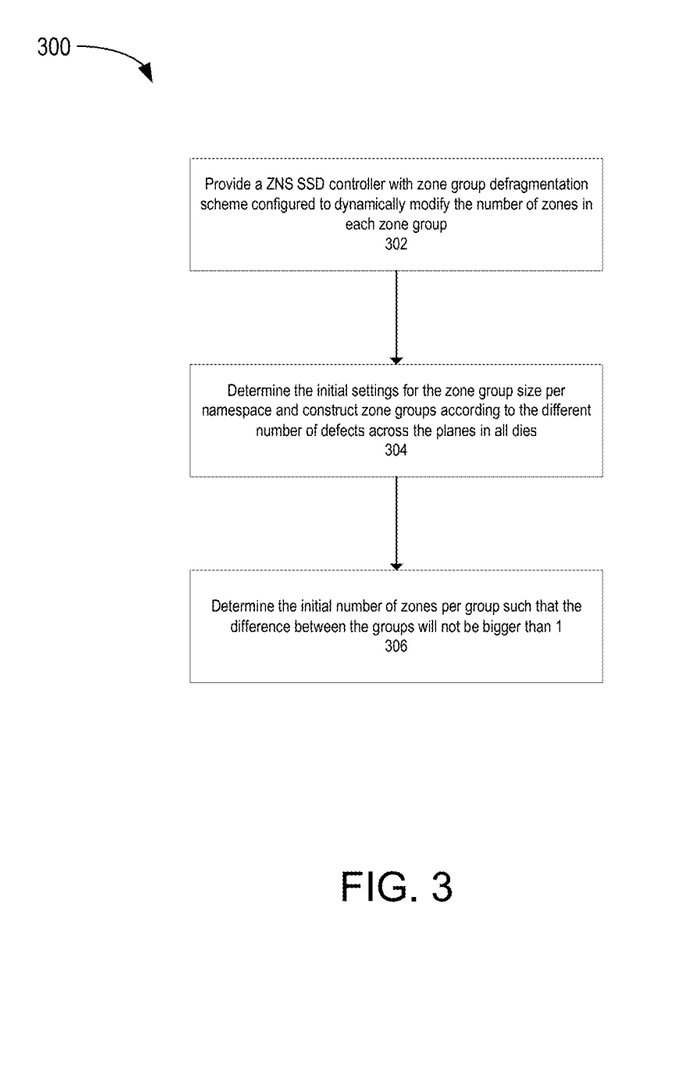
FIG. 3 is flowchart illustrating zone group creation according to one embodiment.

FIG. 3 is flowchart 300 illustrating zone group creation according to one embodiment. As shown in FIG. 3, the ZNS controller is provided with a zone group defragmentation scheme configured to dynamically modify the number of zones in each zone group at 302. Thereafter, the initial settings for the zone group are determined at 304. The initial settings are per namespace. The zone groups are constructed according to the different number of defects across the planes in all dies. Finally, the initial number of zones per group is determined such that the difference between the groups will not be bigger than 1 at 306. As a result of trying to maximize the number of usable blocks in the system as well as maximizing performance, different zone groups have different sizes. The initial algorithm that determines the size of the zone-group will try to keep the size difference at 1. It is to be understood that the different of not bigger than 1 is merely an example as other zone group size differences are contemplated.

Figure 4:
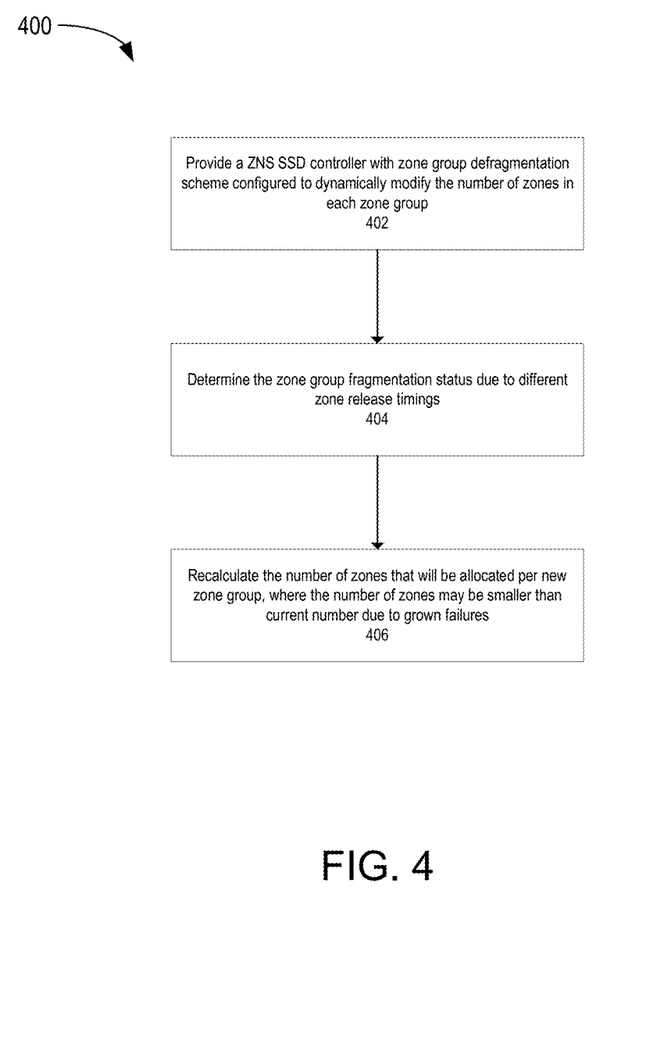
FIG. 4 is flowchart illustrating zone group recalibration due to fragmentation and/or block defects according to one embodiment.

FIG. 4 is flowchart 400 illustrating zone group recalibration due to fragmentation and/or defects according to one embodiment. Any time that a zone group is created, the drive will try to construct a zone group according to the current algorithm parameters. In case of fragmentation that is a result of different zone release timing, such zone group construction might not be possible. In such case, the data storage will recalculate the parameters and come up with the new optimal zone group size, which might be smaller. Initially, the ZNS controller is provided with a zone group defragmentation scheme configured to dynamically modify the number of zones in each zone group at 402. Thereafter, the controller determines the zone group fragmentation status due to different zone release timings at 404. Finally, the controller recalculates the number of zones that will be allocated per new zone group where the number of zones may be smaller than the current number due to grown failures at 406.

Figure 5:
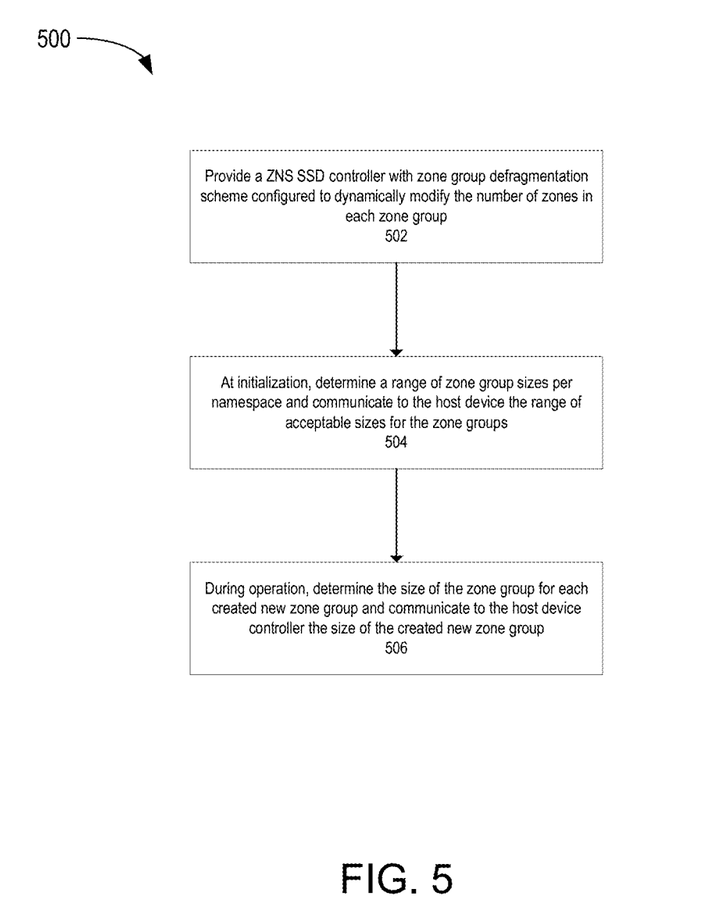
FIG. 5 is flowchart illustrating zone group creation according to another embodiment.

FIG. 5 is flowchart 500 illustrating zone group creation according to another embodiment. Currently the data storage device can only communicate to the host device a single size for the zone group, and for the entire lifetime. Rather than have a single size, during initialization, the data storage device may communicate to the host device a range for the zone group size, and data storage device should be able to notify the host device the actual size on every zone group creation. It is also contemplated that the host device may query the next size. Initially, the ZNS controller is provided with a zone group defragmentation scheme configured to dynamically modify the number of zones in each zone group at 502. Thereafter, at initialization, the controller determines a range of zone group sizes per namespace and communicates such to the host device at 504. Finally, during operation, the controller determines that the size of the zone group for each created zone group and communicates such to the host device controller at 506 so that the host device can command creation of an appropriately sized zone group.

Figure 6:
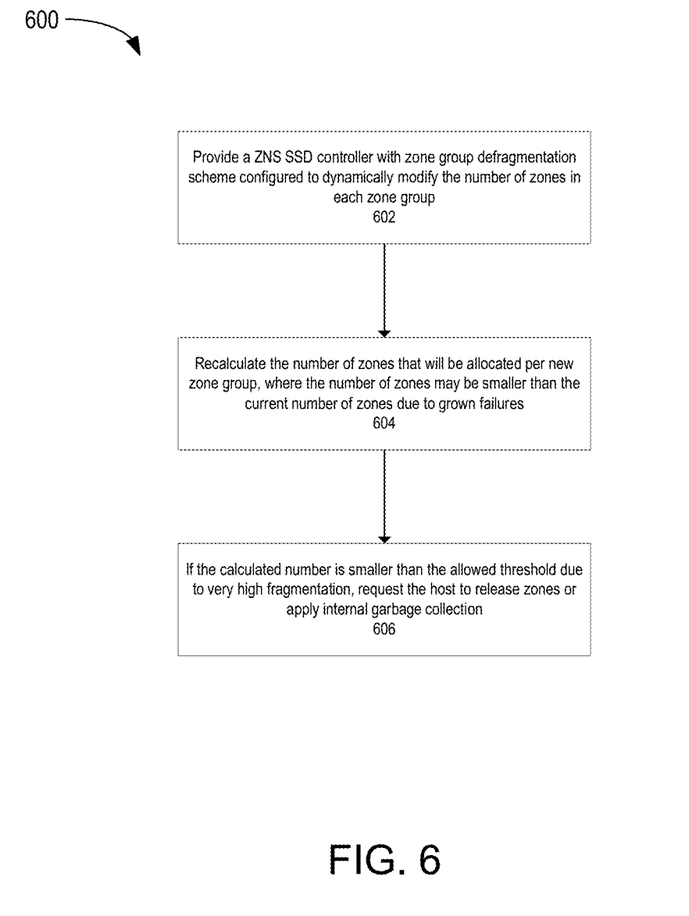
FIG. 6 is flowchart illustrating zone group recalibration due to fragmentation and/or block defects according to another embodiment.

FIG. 6 is flowchart 600 illustrating zone group recalibration due to fragmentation according to another embodiment. If the size of the zone group is about to fall below the minimum desired size, for example due to very high fragmentation that is a result of different zone release timing, the data storage device may still use the legacy method in order to notify host to release specific zones, or to apply internal GC. Initially, the ZNS controller is provided with a zone group defragmentation scheme configured to dynamically modify the number of zones in each zone group at 602. Thereafter, the controller recalculates the number of zones that will be allocated per new zone group at 604, where the number of zones per zone group is smaller than the current number of zones (e.g., below a threshold) due to grown failures. It is contemplated that the number of zones per zone group can actually grow due to GC or block releases. Finally, if the calculated number is smaller than the allowed threshold due to very high fragmentation, the controller requests the host device to release zones or the controller apply internal GC at 606.

It is also contemplated that the zone lifetime hints provided by the host device can be utilized advantageously during zone group formation. More specifically, in the case that the host device supplies zone lifetime hints, further proactive zone group balancing can be used to reduce the likelihood of fragmentation and imbalance across planes and dies.

Figure 7:
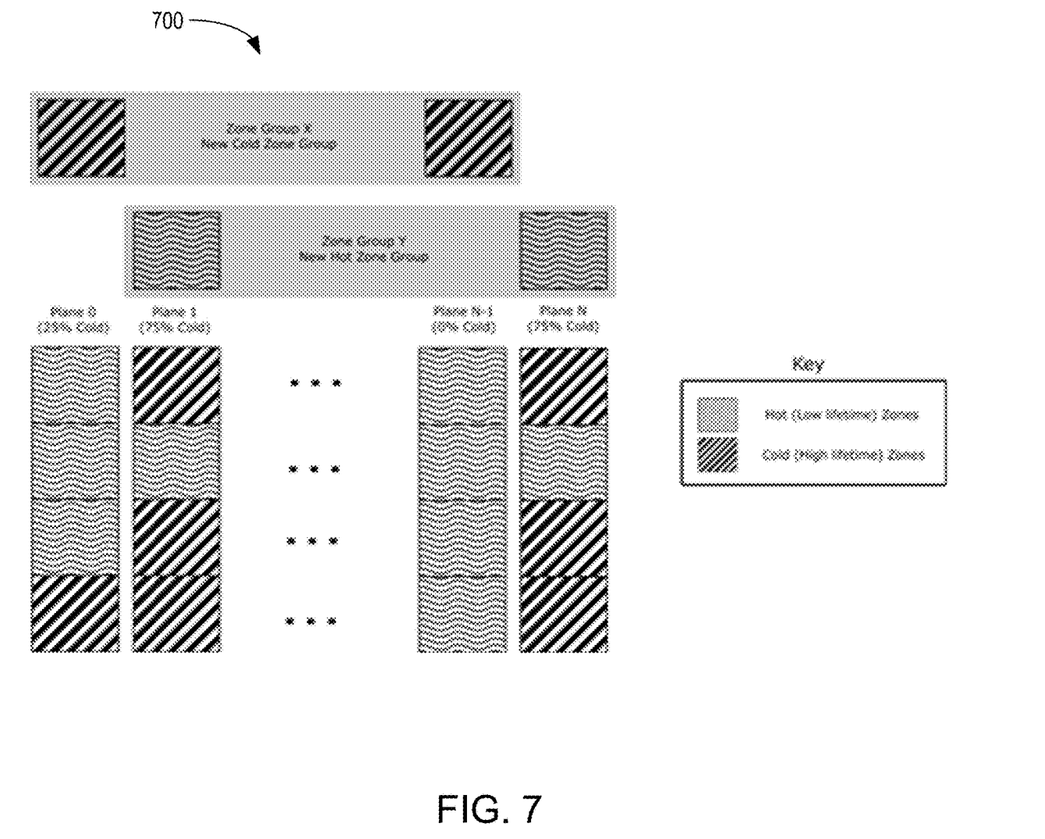
FIG. 7 is schematic illustration of zone group creation based upon host device hints according to one embodiment.

FIG. 7 is schematic illustration 700 of zone group creation based upon host device hints according to one embodiment. Balancing short lived (i.e., hot) and long lived (i.e., cold) zones across planes and die is desired. In illustration 700, new cold zone groups (zone group X) zones are chosen to even out the cold zones across all planes by choosing planes with the least cold zones on them. When new hot zone groups (zone group Y) are formed, zones are chosen to even out the hot zones across all planes by choosing the planes with least hot zones.

Figure 8:
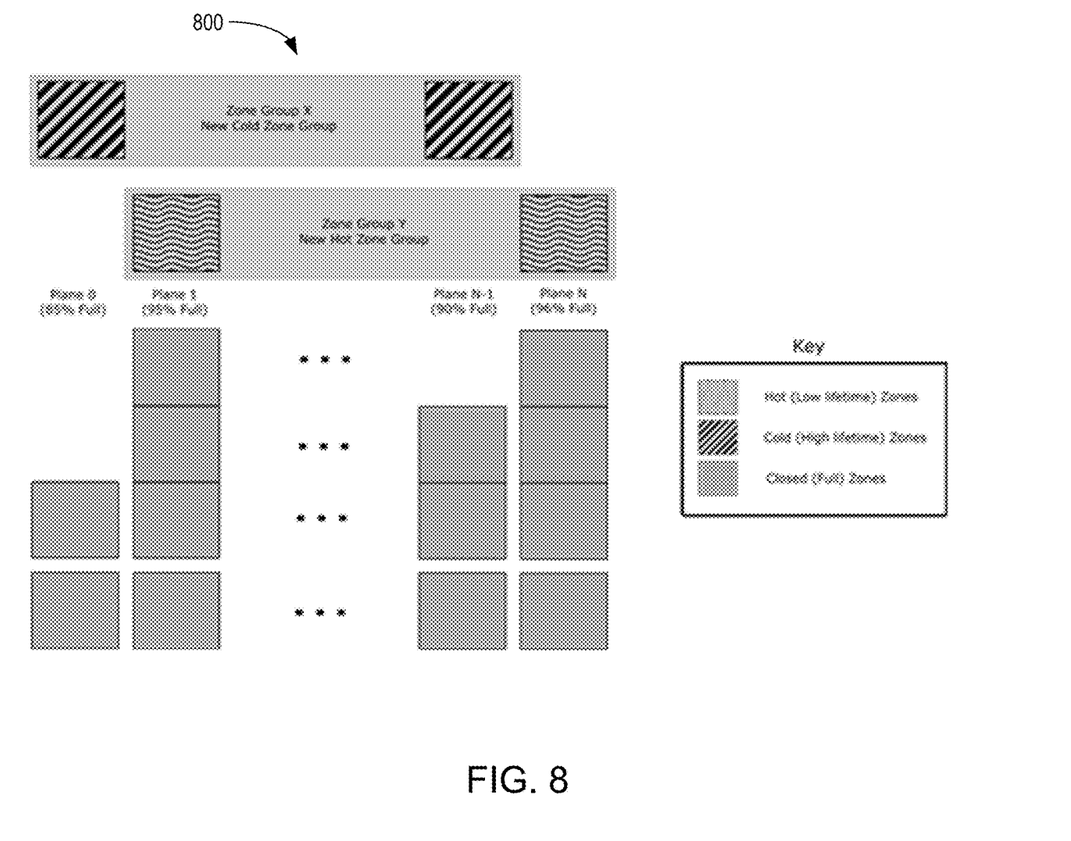
FIG. 8 is schematic illustration of zone groups that were created based upon host device hints according to one embodiment.

Balancing data across plane imbalances is beneficial for spreading out potential bad blocks and good blocks. Some planes/die have more good blocks than others or are more full due to imbalance of host resetting zones in a unbalanced manner. FIG. 8 is schematic illustration 800 of zone groups that were created based upon host device hints according to one embodiment. In illustration 800, new cold zone groups (i.e., zone group X) zones are placed on planes/die that have greater free space. Similarly, new hot zone groups (i.e., zone group Y) zones are placed on planes/die that have less free space.

Figure 9:
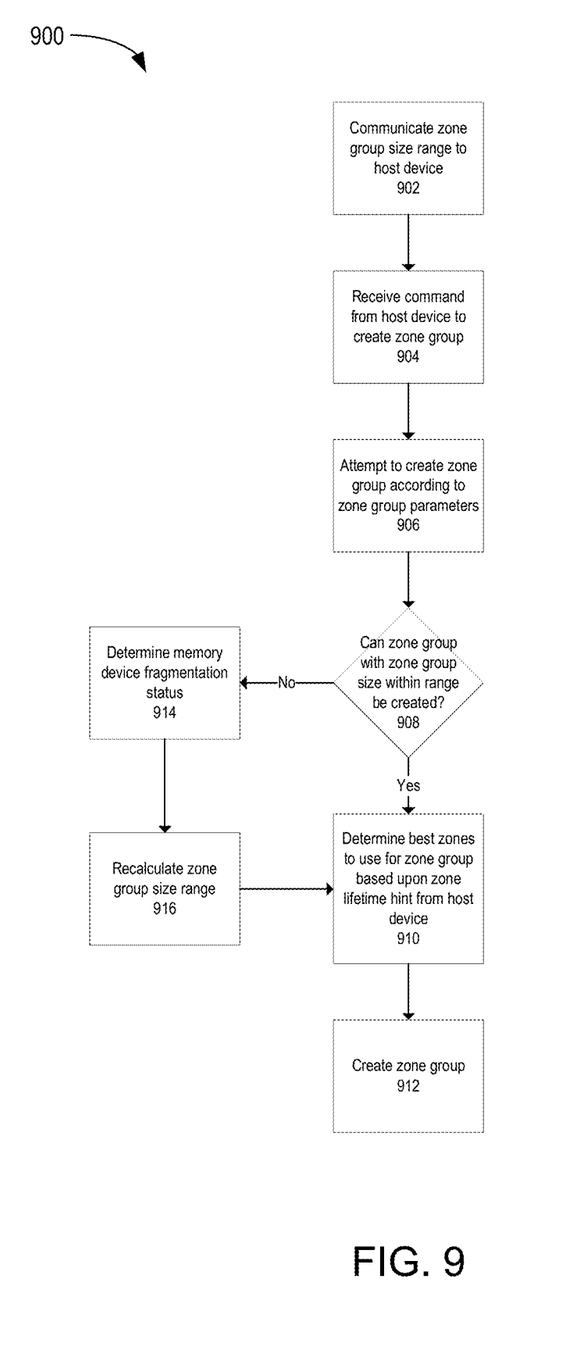
FIG. 9 is a flowchart illustrating zone group creation and recalibration according to one embodiment.

FIG. 9 is a flowchart 900 illustrating zone group creation and recalibration according to one embodiment. Initially, the data storage device communicates a zone group size range to a host device at 902. At some point in time thereafter, the data storage device receives a command from the host device to create a zone group at 904. The controller will then attempt to create the zone group according to the already established zone group parameters at 906. The controller will make a determination at 908 regarding whether the zone group with the particular zone group size can be created. If the zone group can be created, then the controller determines the best zones to use for the zone group based upon the zone lifetime hint from the host device at 910 and then creates the zone group at 912. If, however, at 908 the zone group cannot be created within the range, then the memory device fragmentation status is determined at 914. The host device may be asked to release some zones or GC may occur based upon the fragmentation status. Thereafter, the zone group size range is recalculated at 916. Finally, the controller determines the best zones to use for the zone group based upon the zone lifetime hint from the host device at 910 and then creates the zone group at 912.

By providing a system solution that optimizes the performance of ZNS using the zone group capability in cases of zone group fragmentation, higher exported capacity (and cost) in ZNS drives that use zone-groups as a result of better utilization of usable blocks in the system is achieved. Additionally, better performance and endurance as a result of lower internal GC within a ZNS drive occurs.

In one embodiment, a data storage device comprises: a memory device; and a controller coupled to the memory device, wherein the controller is configured to: detect zone group fragmentations; and allocate a different number of zones within a new zone group compared to an already existing zone group. The controller is configured to provide a zone group size range to a host device during initialization. The controller is configured to run a zone group creation algorithm when a host device instructs the data storage device to create a zone group. The controller is configured to determine an initial number of zones per zone group such that a difference in number of zones per zone group is not greater than 1. The controller is configured to receive zone lifetime hints from a host device. The controller is configured to determine zone group fragmentation status due to different zone release timings. The controller is configured to recalculate a number of zones that will be allocated per new zone group. The number of zones after recalculating will be lower than prior to recalculating. The controller is configured to determine that the number of zones after recalculating is below a threshold. The controller is configured to request a host device to release zones. The controller is configured to perform garbage collection in response to determining that the number of zones after recalculating is below the threshold. The controller is configured to inform a host device of actual zone group size for every zone group creation.

In another embodiment, a data storage device comprises: a memory device; and a controller coupled to the memory device, wherein the controller is configured to: receive a zone lifetime hint from a host device; balance short lived and long lived zones across planes and dies of the memory device based upon the zone lifetime hint, wherein the balancing occurs in zone group creation and wherein a number of zones within a zone group is dynamic; and create a zone group based upon the balancing. The balancing comprises evening out long lived zones by choosing planes with a smallest number of long lived zones across all planes. The balancing comprises evening out short lived zones by choosing planes with a smallest number of short lived zones across all planes. The controller is further configured to place new long lived zone groups on planes/dies of the memory device that have a greater amount of free space compared to other planes/dies. The controller is further configured to place new short lived zone groups on planes/dies of the memory device that have a lesser amount of free space compared to other planes/dies.

In another embodiment, a data storage device comprises: memory means; and a controller coupled to the memory means, wherein the controller is configured to: dynamically adjust zone group size; communicate a zone group size range to a host device; and balance short lived and long lived zones across planes and dies of the memory means based upon a zone lifetime hint received from the host device. The dynamically adjusting is in response to the controller detecting fragmentation of the memory means. The detected fragmentation results in the zone group size being outside of the zone group size range communicated to the host device.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
detect zone group fragmentations;
run a zone group creation algorithm when a host device instructs the data storage device to create one or more new zone groups;
allocate a different number of zones within a new zone group of the one or more new zone groups compared to an already existing zone group;
determine one or more zones to use for each of the one or more new zone groups based on a zone lifetime hint from the host device, wherein the zone lifetime hint is an indicator whether a zone is a short lived zone or a long lived zone, wherein at least one zone of the one or more zones is used in the already existing zone group; and create the one or more new zone groups based on the determining.

2. The data storage device of claim 1, wherein the controller is configured to provide a zone group size range to a host device.

3. The data storage device of claim 1, wherein the controller is configured to determine an initial number of zones per zone group such that a difference in number of zones per zone group is not greater than 1.

4. The data storage device of claim 1, wherein the controller is configured to receive zone lifetime hints from a host device.

5. The data storage device of claim 1, wherein the controller is configured to determine zone group fragmentation status based on current max parallelism of planes/dies across available free blocks.

6. The data storage device of claim 5, wherein the controller is configured to recalculate a number of zones that will be allocated per new zone group based on available parallelism.

7. The data storage device of claim 6, wherein the number of zones after recalculating might be lower or higher than prior to recalculating.

8. The data storage device of claim 6, wherein the controller is configured to determine whether the number of zones after recalculating is below a threshold.

9. The data storage device of claim 8, wherein the controller is configured to request a host device to release zones that are written currently in dies/planes with no available free blocks, if the number of zones after recalculating is below the threshold.

10. The data storage device of claim 8, wherein the controller is configured to perform garbage collection in response to determining that the number of zones after recalculating is below the threshold.

11. The data storage device of claim 1, wherein the controller is configured to inform a host device of actual zone group size for every zone group creation.

12. A data storage device, comprising:
a memory device; and
a controller coupled to the memory device, wherein the controller is configured to:
receive a zone lifetime hint from a host device, wherein the zone lifetime hint is an indicator whether a zone is a short lived zone or a long lived zone;
run a zone group creation algorithm when the host device instructs the data storage device to create one or more new zone groups, wherein the zone group creation algorithm comprises balancing short lived and long lived zones across planes and dies of the memory device based upon the zone lifetime hint, wherein a number of zones within a zone group is dynamic, wherein at least one zone used to create each one or more new zone group is used in an already existing zone group; and
create the one or more new zone groups based upon the balancing.

13. The data storage device of claim 12, wherein the balancing comprises evening out long lived zones by choosing planes with a smallest number of long lived zones across all planes.

14. The data storage device of claim 12, wherein the balancing comprises evening out short lived zones by choosing planes with a smallest number of short lived zones across all planes.

15. The data storage device of claim 12, wherein the controller is further configured to place new long lived zone groups on planes/dies of the memory device that have a greater amount of free space compared to other planes/dies.

16. The data storage device of claim 12, wherein the controller is further configured to place new short lived zone groups on planes/dies of the memory device that have a lesser amount of free space compared to other planes/dies.

17. A data storage device, comprising:
memory means; and
a controller coupled to the memory means, wherein the controller is configured to:
dynamically adjust a group size of one or more zone groups to balance short lived and long lived zones across planes and dies of the memory means, wherein the dynamically adjusting comprises:
determining one or more zones to use for each of the one or more zone groups based on a zone lifetime hint from a host device, wherein the zone lifetime hint is an indicator whether a zone is a short lived zone or a long lived zone, wherein at least one zone of the one or more zones is used in an already existing zone group; and
creating the one or more zone groups based on the determining; and
communicate a zone group size range to a host device.

18. The data storage device of claim 17, wherein the dynamically adjusting is in response to the controller detecting fragmentation of the memory means.

19. The data storage device of claim 18, wherein the detected fragmentation results in the zone group size being outside of the zone group size range communicated to the host device.

20. The data storage device of claim 1, wherein the determining comprises balancing short lived and long lived zones across planes and dies of the memory device.

* * * * *